July 3, 1951 F. N. GILLETTE ET AL 2,559,499

ELECTRONIC SWITCH CIRCUIT

Filed Oct. 21, 1949 2 Sheets-Sheet 1

Inventor
FRANK N. GILLETTE
RICHARD W. LEE

By

H. A. Mackey
Attorney

July 3, 1951 F. N. GILLETTE ET AL 2,559,499

ELECTRONIC SWITCH CIRCUIT

Filed Oct. 21, 1949 2 Sheets-Sheet 2

Inventor
FRANK N. GILLETTE
RICHARD W. LEE

By H. L. Mackey
Attorney

Patented July 3, 1951

2,559,499

UNITED STATES PATENT OFFICE 2,559,499

ELECTRONIC SWITCH CIRCUIT

Frank N. Gillette and Richard W. Lee, Pleasantville, N. Y., assignors to General Precision Laboratory Incorporated, a corporation of New York Application October 21, 1949, Serial No. 122,776

6 Claims. (Cl. 250—27)

This invention pertains to electronic switches and particularly to electronic time sequence switches.

An electrical switch is conventionally defined as a mechanical device for the repeated separation and connection of two metallic conductors. The mechanical means for moving one of the contacts, called the switch arm or blade, may be manual means as in dial, knife and disconnect switches, or motor means as in telephone selectors and automatic circuit breakers.

An electronic switch is a device for separating and joining two conductors by the intermediation of an electron stream. The electron stream thus has the function of the switch arm or blade in mechanical switches. Any electronic device for changing the parameters of a circuit in which it is connected may in fact be termed an electronic switch. Such a switch may be employed to control the absolute potential level of a point in a circuit, or to control the transmission of a signal by switching it on or off, or to choose between different signals. Electronic switches, like mechanical switches, may be either manual or automatic. The flexibility of electronic switching and of the control thereof permits its use not only to duplicate nearly all mechanical switching operations, but to perform other operations that cannot be done mechanically. For instance, mechanical switches are incapable of operation above a certain speed, perhaps 1000 cycles per second, but the speed of electronic switching has no limit except that imposed by electronic transit time, which is about the speed of light.

The instant invention concerns automatic electronic switching in which the operation of a mechanical dial switch, either single or multipole, is simulated. The automatic control is imposed in a particular manner so that the operation of the switch from switch-point to switch-point is periodic, and so that the complete cycle of operations is repeated also in a regularly periodic manner. The electronic switch of this invention may be thought of as a device for converting a space-voltage relation to a time-voltage relation. For example, several voltages simultaneously and independently existing in several separate circuits may be applied consecutively in time to a single output circuit by the apparatus of this invention, so that the several voltages are transmitted one after the other in a time sequence along the output circuit.

The instant invention employs an oscillatory generator to originate a timing voltage, a timer to convert the timing voltage into a suitable form, a gated amplifier or gating tube, and a switched tube. The two latter elements may be referred to together as a time-selector circuit. A number of identical input circuits are employed for the introduction of signals, each consisting of a direct current preselected voltage, while only a single output circuit is necessary. Such an arrangement is somewhat analogous to a single-deck dial switch having a single switch arm connected to an output terminal. Several groups of input circuits may of course be employed, each with its own output circuit, by duplicating some of the components of the apparatus. Such an arrangement resembles a dial switch having several dials, each with its own switch arm.

One purpose then of this invention is to switch electronically a number of input circuits individually and one after the other into electrical connection with a single output circuit.

Another purpose of this invention is to convert several electrical magnitudes simultaneously existing in separate circuits into equivalent electrical magnitudes consecutively transmitted through a single circuit.

Still another purpose of this invention is to generate a regularly periodic electrical quantity, apply it to control of a timing chain for the production of consecutive pulses in a plurality of circuits, and to control by these pulses consecutive connections, one at a time, between a plurality of input circuits and a single output circuit.

For a better understanding of the invention reference is made to the detailed description and the accompanying drawings, in which.

Figures 1, 2:
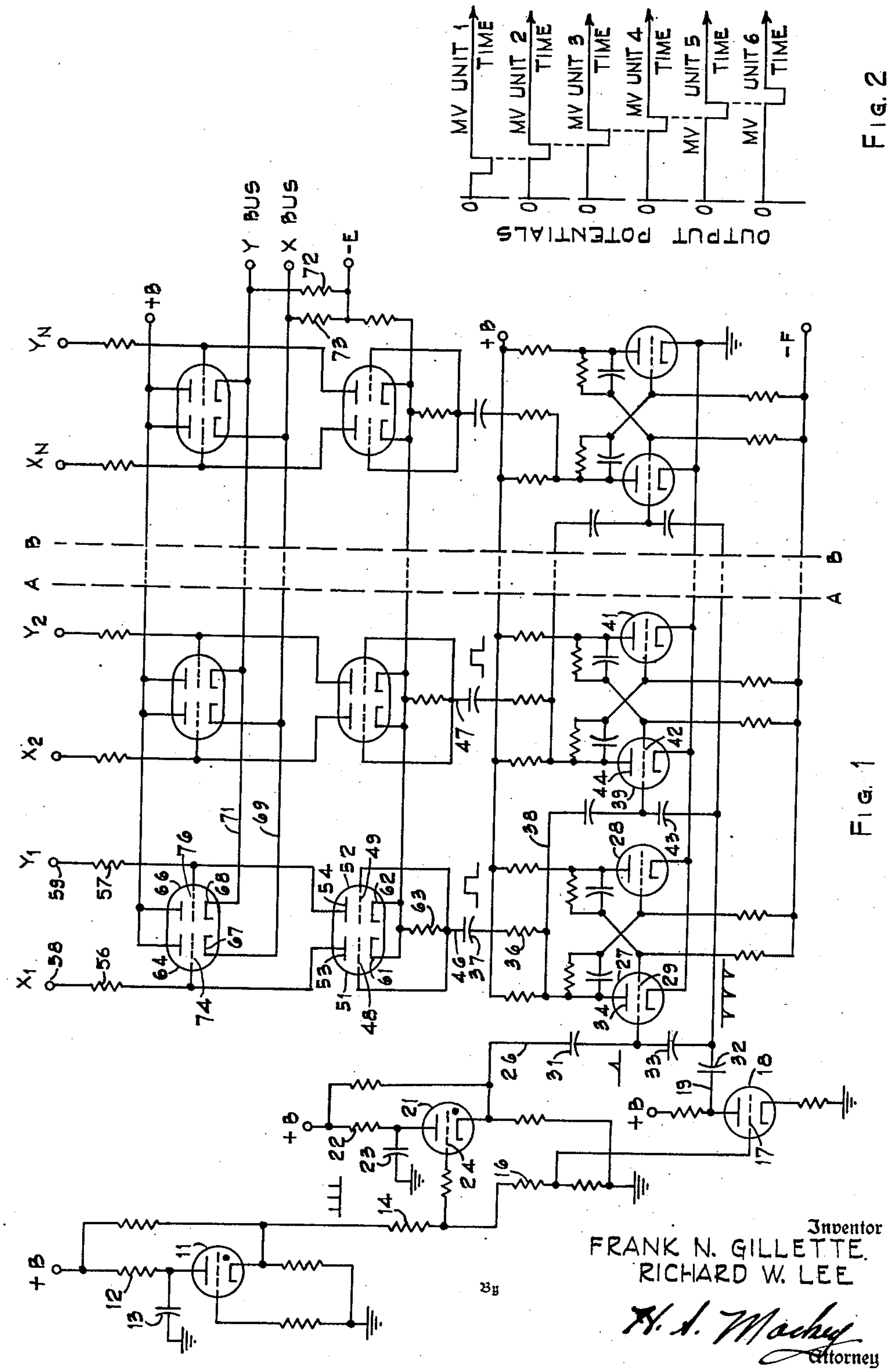
Figure 1 is a schematic wiring diagram of one form of the invention.
Figure 2 is a group of graphs illustrating the operation of the timer.

Referring now to Fig. 1, a gaseous triode 11 is connected as a relaxation oscillator having its frequency of oscillation controlled by the resistor 12 and condenser 13. The periodic positive cathode pulses are transmitted through resistors 14 and 16 to the control grid 17 of an inverting triode 18, the anode of which supplies negative pulses to a conductor 19. The frequency of these pulses is that of the oscillator 11, and may be termed the sequence frequency.

A second gaseous triode 21 is connected as a second oscillator controlled by the resistor 22 and condenser 23. Its frequency is termed the cycle frequency and is lower than that of the triode 11. The free-running cycle frequency is made slightly less than a selected submultiple of the sequence frequency, so that sequence frequency pulses applied to the grid 24 of the triode 21 trigger the latter tube and therefore each of its pulses coincides exactly with one of the sequence pulses. The output of the tube 21 is derived from its cathode by the conductor 26.

The three tubes 11, 18 and 21 and their circuits constitute the oscillatory generator element, the sequence frequency thereof being the timing frequency that controls the duration of each input voltage or a representation thereof in sequence in the output circuit.

The circuit of Fig. 1 exemplifies an embodiment of the invention suitable for controlling the X and Y coordinate deflection circuits of a cathode ray tube sequentially in accordance with pairs of input voltages representing the rectangular coordinates of points in a plane. Accordingly the input voltages are applied to conductors in pairs and are indicated $X_1$ $Y_1$, $X_2$ $Y_2$, etc., the gating and switched circuits are twinned, the timing circuits has as many units as there are input pairs, and there are two output circuits marked "X bus" and "Y bus." Where all input circuits are unrelated and there is a single output circuit, the timing circuit has as many units as there are input circuits, and in general has as many units as there are input circuits per output bus.

In Fig. 1 three pairs of input circuits are depicted but any additional number, limited only by the desired shortness of period of the output voltage element, may be added between the dotted lines AA and BB. Therewith must be added additional units of the timer, gating and switch elements in like amount and interconnected exactly as shown for those depicted.

The timing circuit consists of a number of identical scale-of-two or bi-stable multivibrators connected as a chain, the first multivibrator of the chain comprising the triodes 27 and 28. The grid 29 of the triode 27 is coupled through a condenser 31 to the conductor 26, so that when the multivibrator tube 27 is in its non-conducting condition, positive cycle pulses received from the conductor 26 cause the tube 27 to conduct; multivibrator action then causing the other tube 28 to become non-conductive. The resulting stable multivibrator state persists until the occurrence of the next negative sequence pulse in the conductor 19, which is transmitted through the condensers 32 and 33 to the same grid 29, making the triode 27 again non-conductive. The changes of the potential of the anode 34 during these two operations of the multivibrator produce a rectangular negative pulse. This pulse is transmitted through the resistor 36 and condenser 37 to the gating tubes and is also transmitted through the conductor 38 to the second multivibrator unit.

At the start of the described action initiated by the cycle trigger, both the positive cycle trigger and the negative sequence trigger are applied simultaneously to the grid 29. However, the circuit is so designed that the positive trigger overrides the negative trigger and initiates the cycle.

The second multivibrator unit consists of the triodes 39 and 41. The grid 42 of the triode 39 is connected through condensers to both the conductor 38 and the conductor 19. When therefore the multivibrator is in the condition in which the triode 39 is non-conducting, the differentiated trailing edge of the rectangular output pulse of the first multivibrator, received through the conductor 38, causes the tube 39 to conduct, and the next sequence pulse through the condenser 43 restores the tube 39 to its non-conducting state. During these operations the changes of potential of the anode 44 produce a negative rectangular pulse.

Since the second multivibrator is triggered by the restoration of the first multivibrator, the leading edge of the second rectangular pulse is coincident in time with the trailing edge of the first rectangular pulse. The following multivibrator stages operate in exactly the same manner, each actuated from the preceding stage, and this successive action of the timer stages results in a series of single half cycles or pulses, each impressed on its own output conductor 46, 47, etc., the start of each coinciding in time with the termination of the preceding pulse. This is clearly illustrated by the graphs of Fig. 2 for a series of 6 multivibrator stages constituting a timer for a device having six independent input circuits.

The chain action is terminated upon the resetting of the last multivibrator stage by a sequence trigger, which in the case of a six-stage timer is the sixth sequence trigger after the cycle trigger. Thereafter the chain is quiescent, with all right-hand (as viewed in Fig. 1) multivibrator tubes in the conducting condition and with the higher voltage level applied to all output conductors. This condition persists until the next cycle pulse again triggers the chain.

It is of course possible to convert the chain timer into a ring timer by connecting the output of the last stage to the input of the first stage and omitting the cycle trigger. In such an arrangement it is necessary to add facilitities for resetting and restarting the operation.

The output conductor 46 of the first timer stage is connected to the grids 48 and 49 of two gating triodes 51 and 52. Their anodes 53 and 54 are connected through resistors 56 and 57 to terminals 58 and 59 to which are supplied the first pair of coordinate input signals $X_1$ and $Y_1$, each being a direct current potential representative in magnitude of a desired input signal value. The cathodes 61 and 62 of the triodes 51 and 52 are connected to a source of negative potential. The grids 48 and 59 are connected through a resistor 63 to their cathodes, therefore in the absence of an input signal pulse at conductor 46 the triodes are highly conductive and the negative cathode potential is applied to the anodes and to the resistors 56 and 57.

Two "switched" triodes 64 and 66 have cathodes 67 and 68 connected respectively to two output conductors 69 and 71 marked respectively X bus and Y bus. These are common to the cathodes of all switched tube stages, and also are connected through resistors 72 and 73 to a highly negative potential source. The control grids 74 and 76 are connected to the gating tube anodes 53 and 54 respectively. The switched tube anodes are connected to a source of positive potential. Under the condition of no timing signal the grids 74 and 76 are thus made highly negative by these connections to the gating tube anodes. The cathodes are held somewhat positive by the action of the other switched stages in a manner to be described more fully hereinafter, so that the switched tubes are completely non-conductive so long as a timing signal is not applied to the gating tube grids 48 and 49.

When a negative timing gate or pulse is applied to the grids of the gating triodes 51 and 52 they are made non-conducting and the anodes as well as the switched tube grids 74 and 76 are permitted to rise to positive potentials determined by the input signals $X_1$ and $Y_1$. Also, the positive potential levels which had existed on the common buses 69 and 71 are simultaneously removed because of removal of excitation from the other switched tube stages in a manner to be described later, thus permitting the cathodes 67 and 68 to tend to assume the $-E$ potential. These changes decrease the bias of the grids 74 and 76, so that the triodes 64 and 66 operate as amplifiers and the potentials applied thereby to the common buses 69 and 71 respectively are in accordance with their operation as cathode followers and are representative of the signals $X_1$ and $Y_1$ applied to their grids. After termination of the timing pulse the potentials of the grids 74 and 76 are again reduced, stopping the electronic currents through the triodes 64 and 66.

Each other stage operates similarly, so that at all times during the operation of the timing chain one input voltage is impressed at a time, and only one upon each output bus. Each bus therefore has impressed upon it a continuous series of positive voltage levels during the operation of the timer chain, one from each input circuit in turn. It is this action that maintains the buses positive at all times during chain operation, so that the cathode of any particular switched tube is maintained positive during the period when its gating tube is not receiving a timing pulse. As a result, each switched tube is non-conductive during operation of other switched tubes as mentioned above.

Since this positive condition of any particular switched tube is produced at any instant by the action of one of the other switched tubes, when the time arrives for the operation of the particular switch tube no other is in action, and the positive condition no longer exists. The cathode of the particular switched tube therefore tends to assume the potential $-E$ through the resistor 72 or 73 and the tube becomes conductive.

Figure 3:
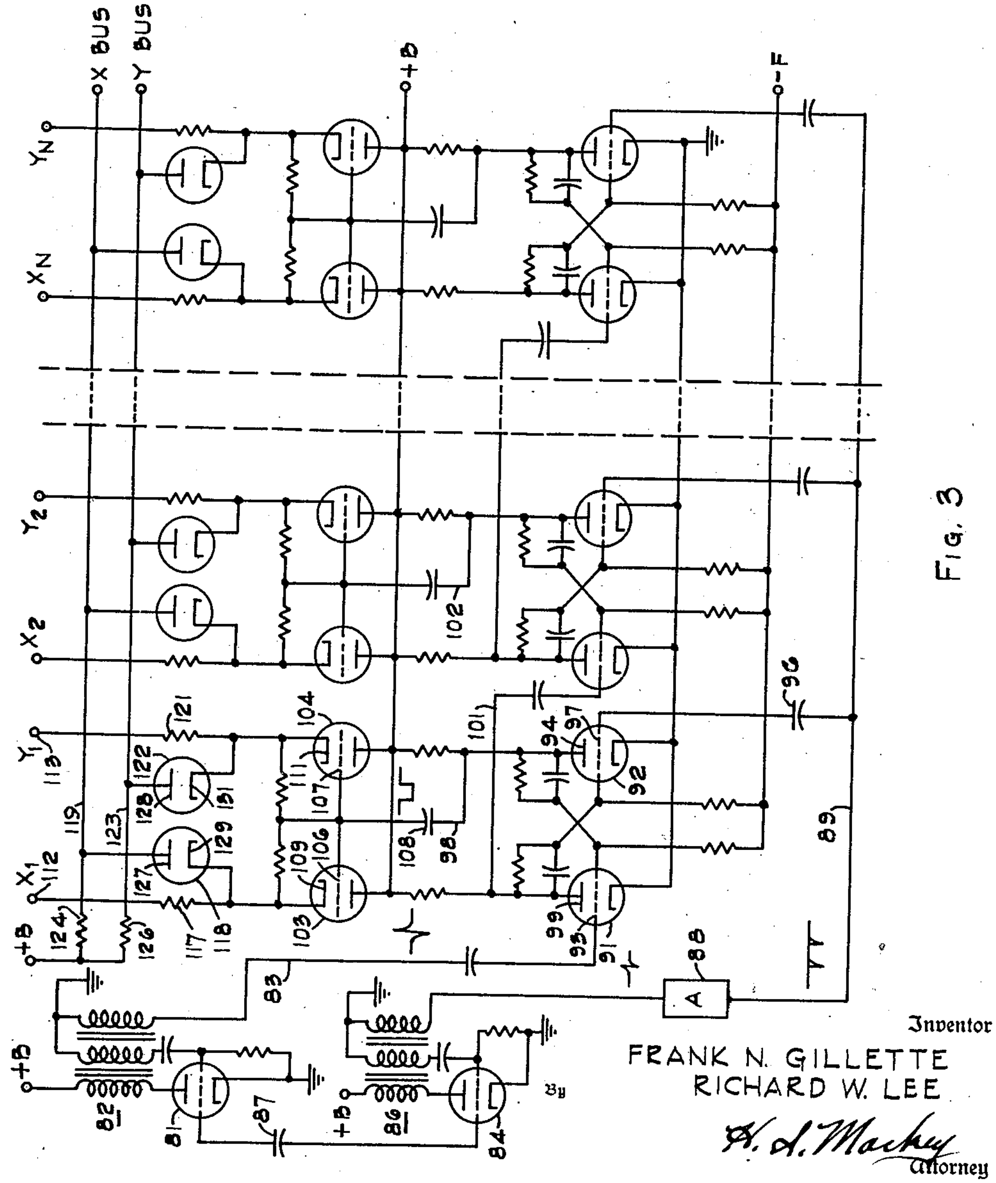
Figure 3 is a schematic wiring diagram of a second form of the invention.

In Fig. 3 there is depicted another method of accomplishing the purposes of this invention, using as before a generator, timer, gating circuit and switched circuit, but each component being somewhat different from that depicted in Fig. 1. The oscillation generator includes a triode 81 connected with a transformer 82 as a free-running blocking oscillator to generate the cycle frequency, which is applied by a tertiary transformer winding to a conductor 83. Both positive and negative surges are produced. The generator also includes a second free-running blocking oscillator composed of the triode 84 and transformer 86. Its frequency is higher than that of the first mentioned oscillator, and its output determines the sequence frequency. In order to synchronize the cycle oscillator with the sequence oscillator a very small condenser 87 is connected between their grids, resulting in the triggering of the cycle timer 81 by and in exact synchronism with a pulse of the sequence timer 86. An amplifier 88 in the output of the sequence oscillator clips negative pulses and inverts positive pulses to form a series of negative pulses at sequence frequency in the output conductor 89.

The timer consists of a series of bistable or scale-of-two multivibrators. The first unit consists of a normally-conductive triode 91 and a normally-open triode 92. When a blocking oscillator cycle-starting pulse is applied to the control grid 93 from the conductor 83, the negative surge thereof throws the multivibrator into its second stable condition, producing a drop in potential at the anode 94. Upon the occurrence of the next sequence trigger in the conductor 89, its negative potential is impressed through the condenser 96 on the grid 97, returning the multivibrator to its first or original stable state. The anode 94 potential rises, completing a negative output gate in the conductor 98 while the anode 99 potential falls, producing a negative surge in the conductor 101 that is transmitted to the second stage and triggers its operation.

Thus successive half cycles or rectangular negative pulses are produced in the output conductors 98, 102, etc. of consecutive multivibrator stages so that if there are six stages the curves of Fig. 2 represent the output exactly as in the case of the circuit of Fig. 1.

The gating circuit for the first unit consists of two triodes 103 and 104 having their control grids 106 and 107 coupled through a condenser 108 to the timer output conductor 98. The anodes are connected to a source of positive potential while the cathodes 109 and 111 are connected through resistors 117 and 121 to the $X_1$ and $Y_1$ input terminals 112 and 113 respectively, which may each have any steady positive potential signal between, for example, zero and +30 volts.

Each switched tube consists of a diode having its anode connected to a common output bus and its cathode connected through a resistor to an input terminal. In the dual circuit depicted the input terminal 112 is connected through the resistor 117 to the cathode 129 of a diode 118, whose anode 127 is connected to a common X bus 119, and the input terminal 113 is connected through the resistor 121 to the cathode 131 of a second diode 122, whose anode 128 is connected to a common Y bus 123. The two common buses are connected through high resistors 124 and 126 to a source of positive potential.

In the absence of a timing signal the triodes 103 and 104 are conductive and their current flows are through the resistors 117 and 121 respectively, acting as cathode resistors, and to ground through the sources of signals $X_1$ and $Y_1$. The cathodes 109 and 111 and the connected cathodes 129 and 131 are thereby held to potentials near that of the +B source. The anodes 127 and 128 of the diodes 118 and 122 are held to a potential considerably less positive than that of the cathodes 109, 111, 129 and 131 by the action of the other switched stages in a manner to be more fully described hereinafter, so that the potentials of the diode cathodes 129 and 131 are more positive than those of the anodes 127 and 128. As a result, the diodes 118 and 122 are non-conductive. When, however, a negative timing pulse is impressed on the triode grids 106 and 107, these triodes become non-conductive, the potential drops in the resistors 117 and 121 disappear, and the cathodes 109 and 111 assume the input signal potentials $X_1$ and $Y_1$. Meanwhile the depression of the potentials of the X and Y buses to +30 volts or less has been removed so that they tend to assume the +B potential. Accordingly the diode anodes become more positive than their cathodes, the diodes become conductive, and the X bus is therefore connected through the diode 118 to the $X_1$ input signal terminal 112 for the duration of the timing pulse. Likewise the Y bus is similarly connected to the $Y_1$ terminal 113. Upon termination of the timing signal the former conditions are restored, again increasing the resistances of the diodes 118 and 122 to very high values, thus disconnecting the input terminals 112 and 113 from the common buses.

As timing pulses are applied to the several units in turn, the input terminals are consecutively connected to the common buses by the above-described process, so that the X and Y buses assume the voltage values $X_1$ $X_2$, etc., and $Y_1$ $Y_2$, etc., in turn without discontinuity. Therefore during the entire timing chain operation each common bus potential is never permitted to become higher than the highest input signal potential, say +30 volts, and cannot approach the +B potential of say +250 volts. It is for this reason that, during continuous operation, the common bus potential presented to the diode anodes of any stage having at the instant no timing signal applied is relatively low.

Figure 4:
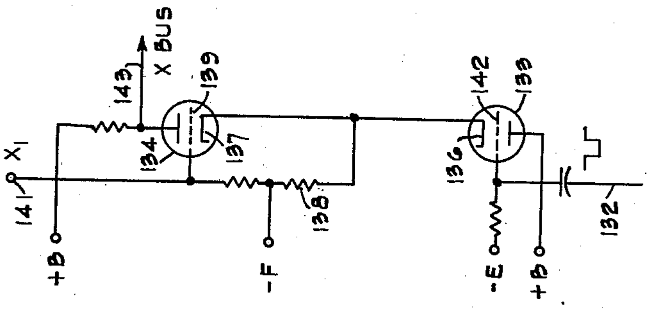
Figure 4 is a schematic wiring diagram of a modification of the time-selector circuit.

Fig. 4 illustrates a third modification of the time-selector circuit that may be used with any desired types of generator and timing circuits. Representation of timing and generator circuits has been omitted as superfluous because either circuit shown in Figs. 1 and 3 may be employed. The timing circuit output conductor carrying a rectangular negative timing pulse is represented by the conductor 132. It may be considered that this conductor is actuated by being connected to the timing circuit output conductor 46 in Fig. 1, or by being connected to conductor 98 in Fig. 3. This modification, which may be termed the triode switch modification, employs a triode gating tube 133, Fig. 4, and a triode switched tube 134, both having their cathodes 136 and 137 returned to negative potential through a common resistor 138. During the switch-off period the gating tube 133 is conducting, and its anode current through resistor 138 raises the common cathode voltage enough to cut off the switched tube 134, rendering it non-conductive and isolating its grid 139 that is connected to the input terminal 141 having impressed upon it the input signal potential $X_1$. The switch is turned on by the application through conductor 132 of the timing pulse. This pulse makes the grid 142 negative, rendering the gating tube 133 non-conductive, reduces the cathode potential to that of the −F source and permits the tube 134 to conduct. It then behaves as a negative feedback amplifier with cathode degeneration, having the signal voltage $X_1$ impressed on its grid 139 so that the potential of the output conductor 143, which may be connected to a common bus such as conductor 69 in Fig. 1 or conductor 119 in Fig. 3, is linearly representative of the $X_1$ potential impressed from the terminal 141 upon the grid 139. The circuit of Fig. 4 therefore has the same types of input and output, and functions similarly to the time-selector circuits of Figs. 1 and 3.

What is claimed is:

1. An electronic switch circuit for sequentially connecting a plurality of separate input circuits to a single output circuit comprising, an oscillation generator generating a train of pulse signals having a selected repetition frequency, a timer circuit including a plurality of multivibrator stages each having an input circuit connected to the output circuit of said oscillation generator and having an input circuit of each succeeding stage connected to the output of the next preceding stage, means for impressing a signal on the first of said stages for producing a signal pulse in the output thereof which is initiated by the signal impressed on the input thereof and terminated by the next succeeding pulse of said train of pulse signals, a pulse being produced in the output of each succeeding stage which is initiated by the termination of the output pulse of the immediate preceding stage and which is terminated by the occurrence of the next succeeding pulse of said train of pulse signals, a plurality of time selector circuits having a common output circuit and separate input circuits connected to separate signal input sources, separate circuits connecting said time selector circuits to the outputs of respective ones of said multivibrator stages for rendering each of said time selector circuits conductive only during the interval that an output pulse of a respective multivibrator stage is impressed thereon whereby said separate signal input sources are sequentially connected to said common output circuit.

2. An electronic switch circuit for sequentially connecting a plurality of separate input circuits to a single output circuit comprising, a first oscillation generator generating a train of pulse signals having a selected repetition frequency, a second oscillation generator generating a train of pulse signals having a repetition frequency which is a submultiple of the repetition frequency of said first mentioned train of pulse signals, a timer circuit including a plurality of multivibrator stages the input of each of which is coupled to the output circuit of said first oscillation generator, an input circuit of the first of said stages being connected to the output of said second oscillation generator whereby an output signal pulse is generated by said first stage which is initiated by a signal pulse generated by said second oscillator and terminated by the next succeeding pulse generated by said first oscillator an input circuit of each succeeding stage being connected to the output of the next preceding stage whereby the output signal pulses generated by each succeeding stage are initiated by the termination of the output pulse of the immediate preceding stage and terminated by the next succeeding pulse generated by said first oscillator, a plurality of time selector circuits having a common output circuit and each having a separate circuit connected to separate signal input sources, separate circuits connecting the inputs of said time selector circuits to the outputs of respective ones of said multivibrator stages for rendering each of said time selector circuits conductive only during the interval that an output pulse of a respective multivibrator stage is impressed thereon whereby said separate signal input sources are sequentially connected to said common output circuit.

3. An electronic switch circuit for sequentially connecting a plurality of separate input circuits to a single output circuit comprising, a first oscillation generator generating a train of pulse signals having a selected repetition frequency, a second oscillation generator generating a train of pulse signals having a repetition frequency which is substantially a submultiple of the repetition frequency of said first mentioned train of pulse signals, a circuit interconnecting the output of said first oscillation generator and the input of said second oscillation generator whereby the occurrence of a signal pulse generated by said second oscillation generator coincides with the occurrence of a selected pulse generated by said first oscillation generator, a timer circuit including a plurality of multivibrator stages the inputs of each of which are coupled to the output circuit of said first oscillation generator, an input circuit of the first of said stages being connected to the output of said second oscillation generator whereby an output signal pulse is generated by said first stage which is initiated by signal pulse generated by said second oscillator and terminated by the next succeeding pulse generated by said first oscillator, an input circuit of each succeeding stage being connected to the output of the next preceding stage whereby the output signal pulses generated by each succeeding stage are initiated by the termination of the output pulse of the immediate preceding stage and terminated by the next succeeding pulse generated by said first oscillator, a plurality of time selector circuits having a common output circuit and each having a separate circuit connected to separate signal input sources, separate circuits connecting the inputs of said time selector circuits to the outputs of respective ones of said multivibrator stages for rendering each of said time selector circuits conductive only during the interval that an output pulse of a respective multivibrator stage is impressed thereon whereby said separate signal input sources are sequentially connected to said common output circuit.

4. An electronic switch circuit for sequentially connecting a plurality of separate input circuits to a single output circuit comprising, an oscillation generator generating a train of pulse signals having a selected repetition frequency, a timer circuit including a plurality of multivibrator stages each having an input circuit connected to the output circuit of said oscillation generator and having an input circuit of each succeeding stage connected to the output of the next preceding stage, means for impressing a signal on the input of the first of said stages producing a signal pulse in the output thereof which is initiated by said impressed signal and terminated by the next succeeding pulse of said train of pulse signals and each succeeding stage produces an output pulse which is initiated by the termination of the output pulse of the immediate preceding stage and terminated by the occurrence of the next succeeding pulse of said train of pulse signals, a plurality of normally conductive gating tubes, circuit means connecting the respective input circuits of said gating tubes to the respective outputs of said multivibrator stages for rendering said respective gating tubes non-conductive during the occurrence of respective multivibrator output pulses, a plurality of normally non-conductive switch tubes having a common output circuit and separate input circuits connected to separate signal sources, circuit means connecting the respective outputs of said gating tubes to the respective inputs of said switch tubes for rendering said switch tubes conductive when said gating tubes are rendered non-conductive and for sequentially connecting said separate signal sources to said common output circuit.

5. An electronic switch circuit for sequentially connecting a plurality of separate input circuits to a single output circuit comprising, a first oscillation generator generating a train of pulse signals having a selected repetition frequency, a second oscillation generator generating a train of pulse signals having a repetition frequency which is a submultiple of the repetition frequency of said first mentioned train of pulse signals, a timer circuit including a plurality of multivibrator stages an input of each of which is coupled to the output of said first oscillation generator, an input circuit of the first of said stages being connected to the output of said second oscillation generator and an input circuit of each succeeding stage being connected to the output of the next preceding stage whereby an output signal pulse is generated by said first stage which is initiated by a signal pulse generated by said second oscillator and terminated by the next succeeding pulse generated by said first oscillator and the output signal pulses generated by each succeeding stage are initiated by the termination of the output signal pulse of the immediate preceding stage and terminated by the next succeeding pulse generated by said first oscillator, a plurality of normally conductive gating tubes, circuit means connecting the respective input circuits of said gating tubes to the respective outputs of said multivibrator stages for rendering said respective gating tubes non-conductive during the occurrence of respective multivibrator output pulses, a plurality of normally non-conductive switch tubes having a common output circuit and separate input circuits connected to separate signal sources, circuit means connecting the respective outputs of said gating tubes to the respective inputs of said switch tubes for rendering a respective switch tube conductive when a respective gating tube is rendered non-conductive and for sequentially connecting said separate signal sources to said common output circuit.

6. An electronic switch circuit for sequentially connecting a plurality of separate input circuits to a single output circuit comprising, a first oscillation generator generating a train of pulse signals having a selected repetition frequency, a second oscillation generator generating a train of pulse signals having a repetition frequency which is substantially a submultiple of the repetition frequency of said first mentioned train of pulse signals, a circuit interconnecting the output of said first oscillation generator and the input of said second oscillation generator whereby the occurrence of a signal pulse generated by said second oscillation generator coincides in time with the occurrence of a selected pulse generated by said first oscillation generator, a timer circuit including a plurality of multivibrator stages an input of each of which is coupled to the output of said first oscillation generator, an input of the first of said stages being connected to the output of said second oscillation generator and an input of each succeeding stage being connected to the output of the next preceding stage whereby an output signal pulse is generated by said first stage which is initiated by a signal pulse generated by said second oscillator and terminated by the next succeeding pulse generated by said first oscillator and the output signal pulses generated by each succeeding stage are initiated by the termination of the output signal pulse of the immediate preceding stage and terminated by the next succeeding pulse generated by said first oscillator, a plurality of normally conductive gating tubes, circuit means connecting the respective input circuits of said gating tubes to the respective outputs of said multivibrator stages for rendering said respective gating tubes non-conductive during the occurrence of respective multivibrator output pulses, a plurality of normally non-conductive switch tubes having a common output circuit and separate input circuits connected to separate signal sources, circuit means connecting the respective outputs of said gating tubes to the respective inputs of said switch tubes for rendering a respective switch tube conductive when a respective gating tube is rendered non-conductive and for sequentially connecting said separate signal sources to said common output circuit.

FRANK N. GILLETTE.
RICHARD W. LEE.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,426,454 | Johnson | Aug. 26, 1947 |